(12) United States Patent
Moore et al.

(10) Patent No.: US 7,783,847 B2
(45) Date of Patent: Aug. 24, 2010

(54) METHOD AND SYSTEM FOR REALLOCATING BLOCKS IN A STORAGE POOL

(75) Inventors: William H. Moore, Fremont, CA (US); Darrin P. Johnson, Mountain View, CA (US); Jeffrey S. Bonwick, Los Altos, CA (US); Tabriz I. Holtz, San Jose, CA (US)

(73) Assignee: Oracle America Inc., Redwood City, CA (US)

( * ) Notice: Subject to any disclaimer, the term of this patent is extended or adjusted under 35 U.S.C. 154(b) by 701 days.

(21) Appl. No.: 11/591,422

(22) Filed: Oct. 31, 2006

(65) Prior Publication Data

US 2008/0104355 A1 May 1, 2008

(51) Int. Cl.
*G06F 12/00* (2006.01)
*G06F 13/00* (2006.01)

(52) U.S. Cl. .............................. 711/161; 711/E12.002; 711/E12.069; 711/E12.083; 711/162; 711/170

(58) Field of Classification Search ................. 711/170, 711/159, 114, 162, E12.002, E12.069, E12.083
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,542,972 B2 | 4/2003 | Ignatius et al. | |
| 6,745,284 B1 | 6/2004 | Lee et al. | |
| 6,745,305 B2 | 6/2004 | McDowell | |
| 6,795,966 B1 | 9/2004 | Lim et al. | |
| 6,829,617 B2 | 12/2004 | Sawdon et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |

(Continued)

OTHER PUBLICATIONS

Goodheart, B., Cox, J., "The Magic Garden Explained", Prentice Hall, pp. 24-25, 29-30, 390-391, 1994.

(Continued)

*Primary Examiner*—Mardochee Chery
(74) *Attorney, Agent, or Firm*—Osha • Liang LLP

(57) ABSTRACT

A method for reallocating blocks in a storage pool involves copying multiple source blocks to multiple replacement blocks, where the source blocks are stored on a source disk in the storage pool, and where the replacement blocks are stored on one or more replacement disks in the storage pool, and generating an indirection object, where the indirection object includes a mapping of locations of the source blocks to locations of the replacement blocks.

17 Claims, 12 Drawing Sheets

U.S. PATENT DOCUMENTS

| | | | |
|---|---|---|---|
| 7,174,352 | B2 | 2/2007 | Kleiman et al. |
| 7,200,715 | B2 | 4/2007 | Kleiman et al. |
| 2002/0004883 | A1 | 1/2002 | Nguyen et al. |
| 2002/0055942 | A1 | 5/2002 | Reynolds |
| 2002/0087788 | A1 | 7/2002 | Morris |
| 2002/0161972 | A1 | 10/2002 | Talagala et al. |
| 2003/0033477 | A1 | 2/2003 | Johnson et al. |
| 2003/0126107 | A1 | 7/2003 | Yamagami |
| 2003/0145167 | A1 | 7/2003 | Tomita |
| 2004/0098720 | A1 | 5/2004 | Hooper |
| 2004/0107314 | A1 | 6/2004 | Kim et al. |
| 2004/0123063 | A1 | 6/2004 | Dalal et al. |
| 2004/0225834 | A1 | 11/2004 | Lu et al. |
| 2004/0234000 | A1 | 11/2004 | Page |
| 2005/0010620 | A1 | 1/2005 | Silvers et al. |
| 2005/0081006 | A1* | 4/2005 | Shackelford et al. ........ 711/162 |
| 2005/0097270 | A1 | 5/2005 | Kleiman et al. |
| 2005/0235154 | A1 | 10/2005 | Serret-Avila |
| 2006/0015696 | A1* | 1/2006 | Nguyen et al. .............. 711/162 |
| 2006/0168409 | A1 | 7/2006 | Kahn et al. |
| 2006/0218644 | A1 | 9/2006 | Niles et al. |
| 2006/0256965 | A1 | 11/2006 | Rowe |
| 2007/0088929 | A1* | 4/2007 | Hanai et al. ................. 711/165 |

OTHER PUBLICATIONS

Austin, B.J., "A Dynamic Disc Allocation Algorithm Designed to Reduce Fragmentation during File Reloading", pp. 378-381, 1970.

Stallings, W., "Computer Organization and Architecture: Designing for Performance", Prentice Hall, pp. 377-378, 2000.

Austin, B. "A Dynamic Disc Allocation Algorithm Designed to Reduce Fragmentation During Filing Reloading", Information Sciences Laboratory, Corporate Research and Development Center, General Electric Company, 4 pages, 1970.

Goodheart, B., Cox, J. "The Magic Garden Explained", Prentice Hall, 8 pages, 1994.

Stallings, W. "Computer Organization and Architecture: Designing for Performance", Prentice Hall, 4 pages, 2000.

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System"; Proceedings of the 1992 USENIX Winter Technical Conference; 1992; (18 pages).

Seltzer, M.L.; "File System Performance and Transaction Support"; University of California at Berkeley, 1992 (131 pages).

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).

"Proceedings of the 5th Annual Linux Showcase & Conference" USENIX Association, Oakland, California, Nov. 5-10, 2001 (11 pages).

* cited by examiner

METHOD AND SYSTEM FOR REALLOCATING BLOCKS IN A STORAGE POOL

CROSS-REFERENCE TO RELATED APPLICATIONS

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (U.S. Pat. No. 7,424,574) filed on Apr. 21, 2004; "Method and Apparatus for Vectored Block-Level Checksum for File System Data Integrity" (U.S. Pat. No. 7,415,653) filed on Apr. 21, 2004; "Method and Apparatus for Identifying Tampering of Data in a File System" U.S. Pat. No. 7,412,450) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (U.S. Pat. No. 7,496,586)filed on May 26, 2004; "Automatic Conversion of All-Zero Data Storage Blocks into File Holes" (U.S. Pat. No. 7,225,314) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Method and System for Data Replication" (application Ser. No. 11/434,296) filed on May 15, 2006; "Multiple Replication Levels with Pooled Devices" (application Ser. No. 11/406,956) filed on Apr. 19, 2006; "Method and System for Per-File and Per-Block Replication" (application Ser. No. 11/406,850) filed on Apr. 19, 2006; "Method and System for Dirty Time Logging" (application Ser. No. 11/407,773) filed on Apr. 19, 2006; "Method and System for Dirty Time Log Directed Resilvering" (application Ser. No. 11/407,744) filed on Apr. 19, 2006; "Method and System for Metadata-Based Resilvering" (application Ser. No. 11/407,719) filed on Apr. 19, 2006; "Method and System for Pruned Resilvering Using a Dirty Time Log" (application Ser. No. 11/409,427) filed on Apr. 19, 2006; "Method and System Using Checksums to Repair Data" (application Ser. No. 11/406,756) filed on Apr. 19, 2006; "Method and System for Repairing Partially Damaged Blocks" (application Ser. No. 11/406,578) filed on Apr. 19, 2006; "Method and System For Storing a Sparse File Using Fill Counts" (application Ser. No. 11/406,592) filed on Apr. 19, 2006; "Method and System for Object Allocation Using Fill Counts" (U.S. Pat. No. 7,480,684) filed on Apr. 20, 2006; "Ditto Blocks" (application Ser. No. 11/406,590) filed on Apr. 19, 2006; "Method and System for Adaptive Metadata Replication" (application Ser. No. 11/406,957) filed on Apr. 19, 2006; "Method and System for Block Reallocation" (application Ser. No. 11/409,435) filed on Apr. 19, 2006; "Method and System for Using a Block Allocation Policy" (application Ser. No. 11/407,637) filed on Apr. 20, 2006; "Block-Based Incremental Backup" (application Ser. No. 11/432,067) filed on May 11, 2006; "Unlimited File System Snapshots and Clones" (application Ser. No. 11/513,800) filed on Aug. 31, 2006; "Reflecting Bandwidth and Priority in Network Attached Storage I/O" (application Ser. No. 11/489,936) filed on Jul. 20, 2006; "Method and System for Power-Managing Storage Devices in a Storage Pool" filed on Oct. 31, 2006; and "Method and System for Priority-Based Allocation in a Storage Pool" filed on Oct. 31, 2006.

BACKGROUND

A typical operating system includes a file system. The file system provides a mechanism for the storage and retrieval of files and a hierarchical directory structure for the naming of multiple files. More specifically, the file system stores information provided by a user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

Typically, to remove a disk from a volume, all data stored on the volume is backed up to an alternate location (i.e., another volume or any other alternate storage device outside of the volume). The volume is then destroyed and subsequently recreated without the disk. Finally, the backed up data is transferred back onto the recreated volume.

SUMMARY

In general, in one aspect, the invention relates to a method for reallocating blocks in a storage pool. The method comprises copying a plurality of source blocks to a plurality of replacement blocks, wherein the plurality of source blocks is stored on a source disk in the storage pool, and wherein the plurality of replacement blocks is stored on at least one replacement disk in the storage pool, and generating a first indirection object, wherein the first indirection object comprises a mapping of locations of the plurality of source blocks to locations of the plurality of replacement blocks.

In general, in one aspect, the invention relates to a system. The system comprises a storage pool comprising a source disk comprising a plurality of source blocks, and a replacement disk, and a file system configured to copy the plurality of source blocks to a plurality of replacement blocks on the replacement disk, and generate an indirection object, wherein the indirection object comprises a mapping of locations of the plurality of source blocks to locations of the plurality of replacement blocks.

In general, in one aspect, the invention relates to a computer readable medium. The computer readable medium comprises executable instructions for reading data in a storage pool by receiving a request to read the data in the storage pool, obtaining a location of a source block associated with the data, identifying a location of a replacement block in the storage pool using an indirection object, wherein the replacement block is a copy of the source block, and wherein the indirection object comprises a mapping of the location of the source block to the location of the replacement block, and retrieving the replacement block in response to the request.

Other aspects of the invention will be apparent from the following description and the appended claims.

DETAILED DESCRIPTION

Figure 1:
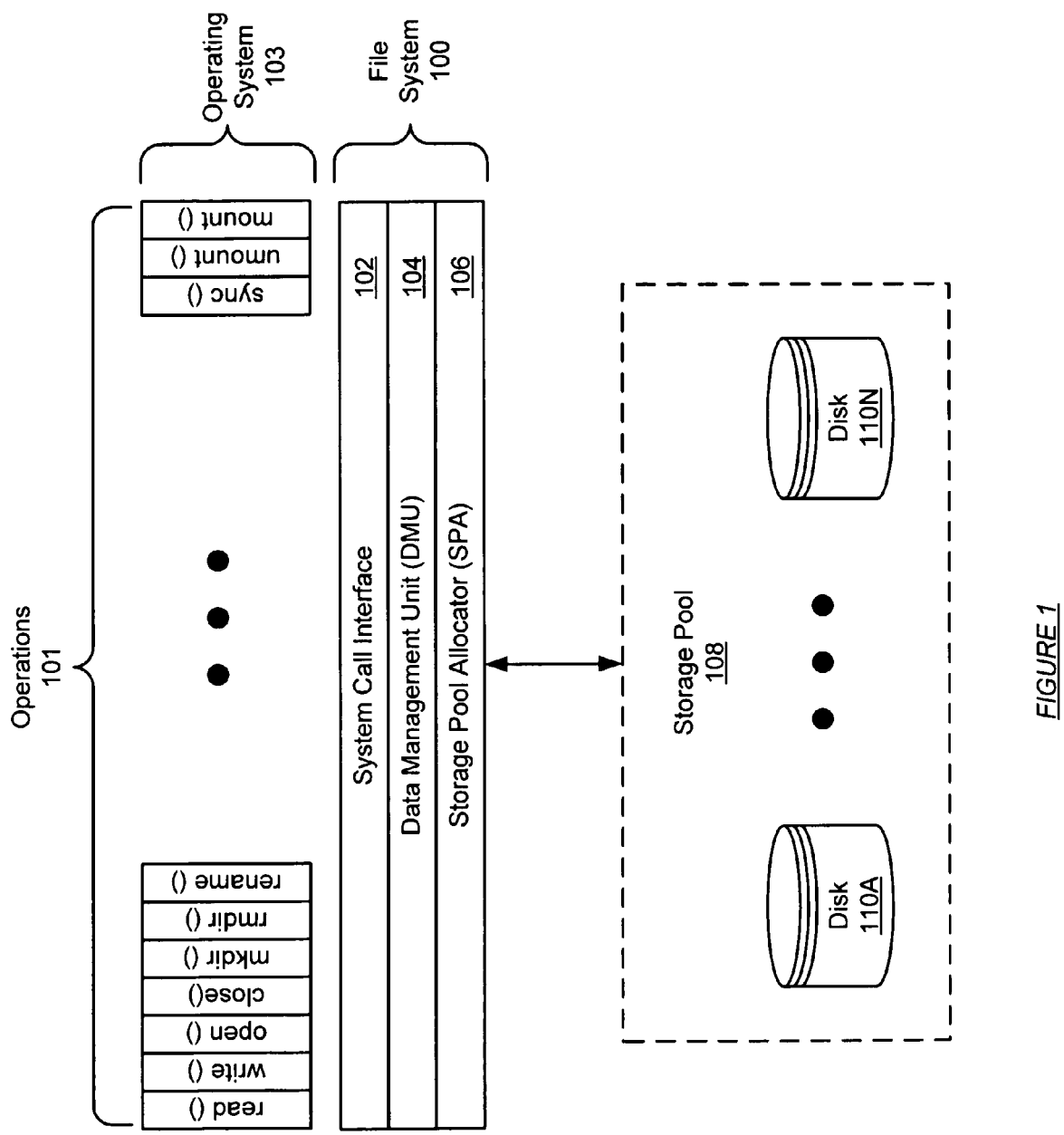
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for reallocating blocks in a storage pool. More specifically, in one embodiment of the invention, source blocks stored on one disk in the storage pool are copied to replacement blocks on one or more other disks in the storage pool. Further, in one embodiment of the invention, an indirection object is generated that provides a mapping of the locations of the source blocks to the locations of the replacement blocks. Further, in one embodiment of the invention, the indirection object may then be used to access the replacement blocks in place of the source blocks.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
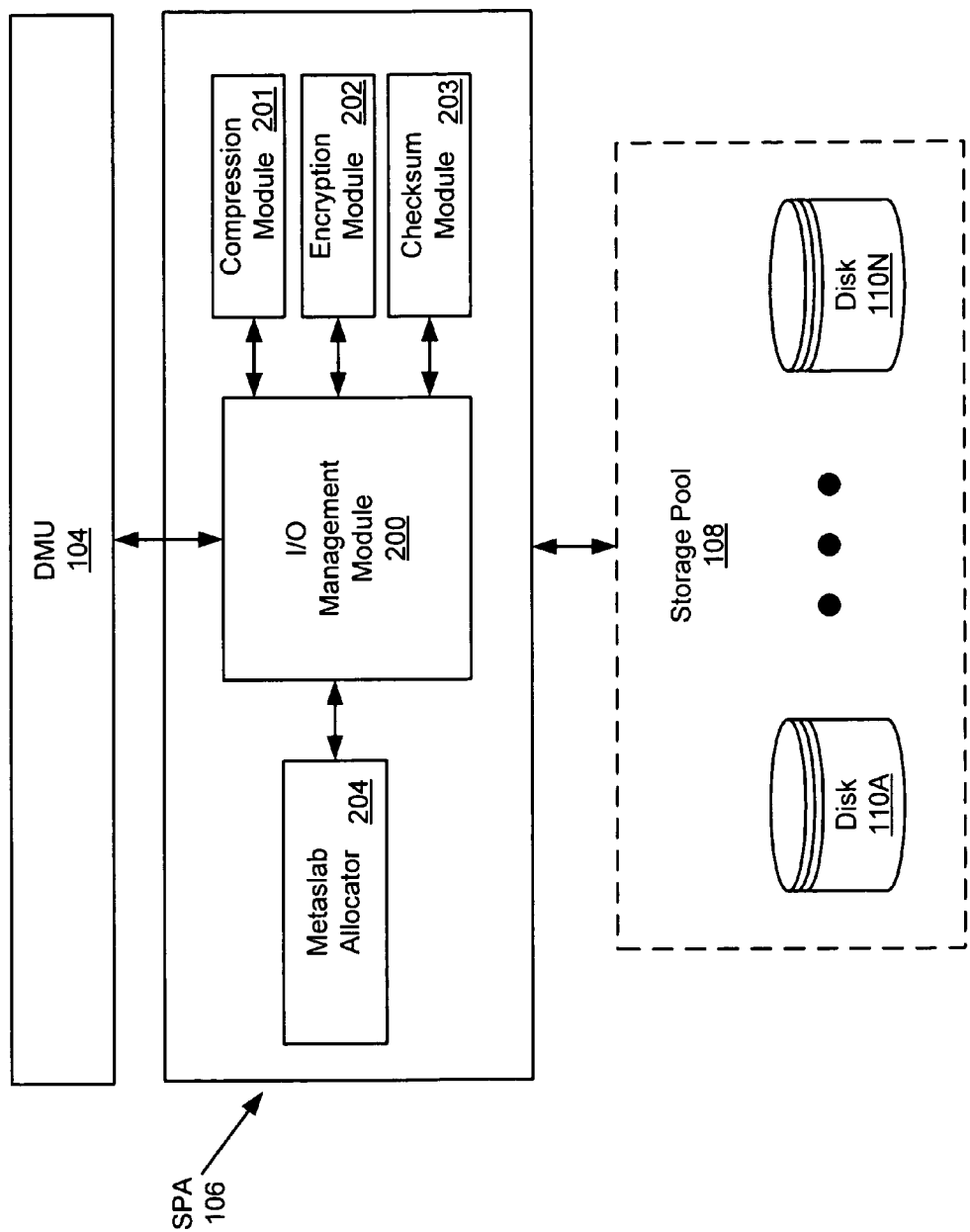
FIG. 2 shows a diagram of a storage pool allocator in accordance with one embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8 K bytes may be compressed to a size of 2 K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

Figure 3:
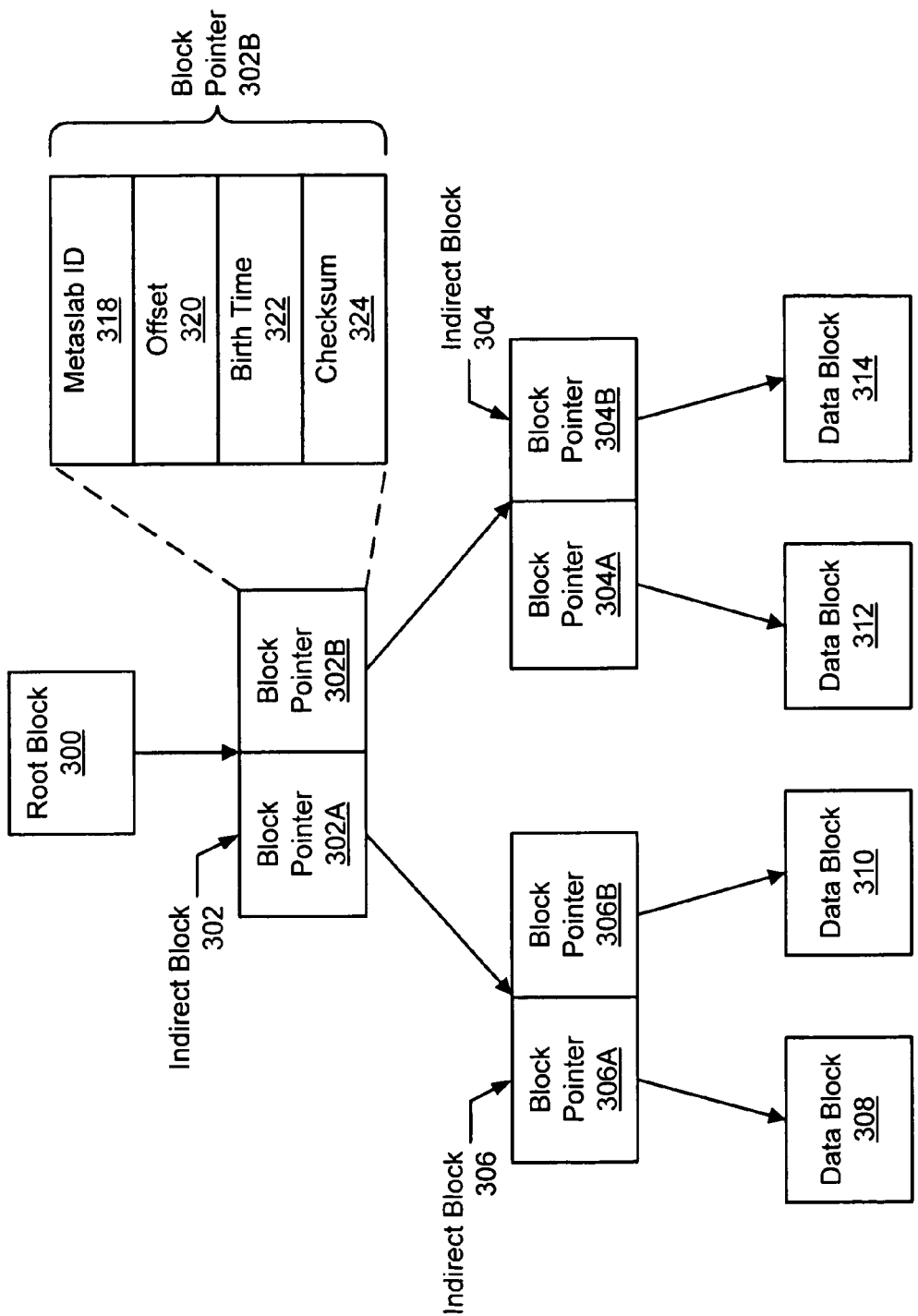
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather, data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) and/or virtual device upon which the metaslab resides and where in the disk and/or virtual device the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
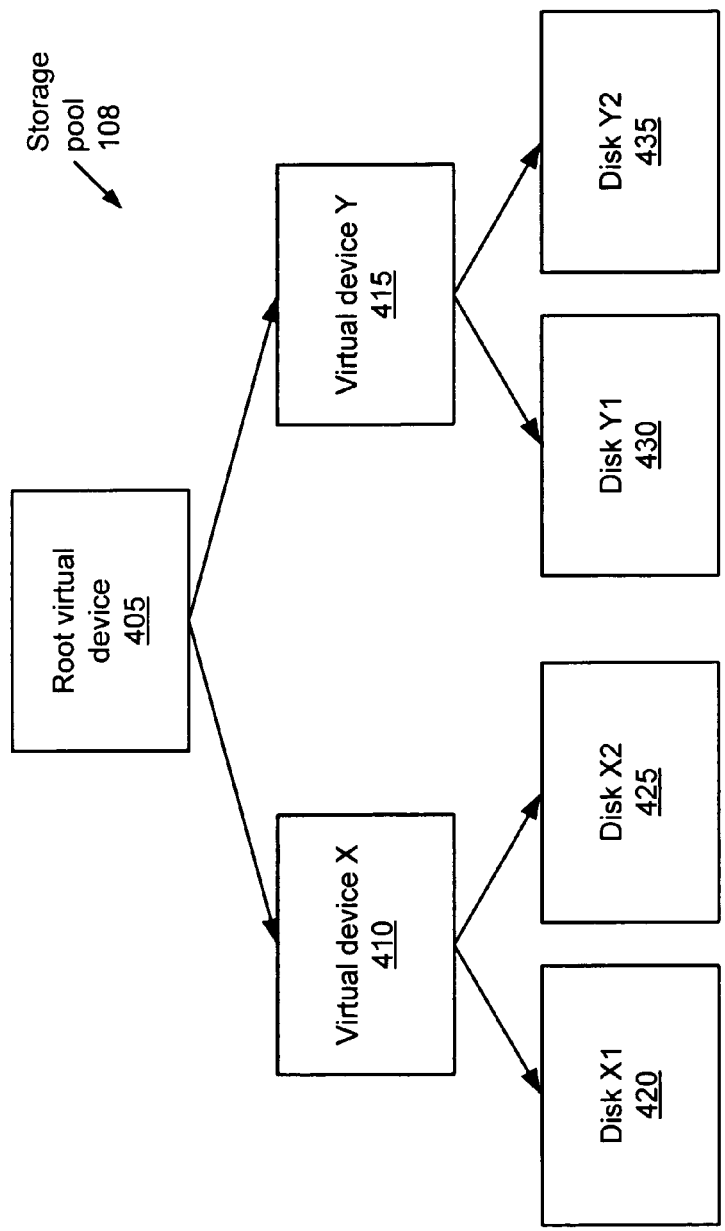
FIG. 4 shows a diagram of a storage pool in accordance with one embodiment of the invention.

FIG. 4 shows a diagram of a storage pool (108) in accordance with one embodiment of the invention. As noted above, a storage pool includes one or more physical disks (e.g., disk X1 (420), disk X2 (425), disk Y1 (430), disk Y2 (435)). Further, disks in the storage pool may be grouped into virtual devices. Specifically, in one embodiment of the invention, virtual devices provide a logical layer of abstraction over underlying physical disks. A process accessing a virtual device typically views the virtual device as a single storage device. That is, the process is not aware of the underlying arrangement of physical disks.

For example, in FIG. 4, disk X1 (420) and disk X2 (425) are grouped into virtual device X (410). Similarly, disk Y1 (430) and disk Y2 (435) are grouped into virtual device Y (415). While FIG. 4 shows two virtual devices (410, 415) each having two underlying physical disks (420, 425 and 430, 435), any other arrangement of virtual devices and/or physical disks may be used. For example, the storage system (108) may include only a single virtual device. Further, a virtual device may have only one underlying physical disk. In one embodiment of the invention, the physical disk(s) themselves are also treated as a class of virtual devices within the file system.

In one embodiment of the invention, virtual devices are configured in a virtual device tree. Accordingly, the storage pool (108) may include a root virtual device (405) acting as a root of the virtual device tree. While the root virtual device (405) illustrated in FIG. 4 has only two immediate children (i.e., virtual device X (410) and virtual device Y (415)), the root virtual device (405) may have any other number of children, as permitted by the file system. Further, the virtual device tree may include any number of levels of virtual devices, and the tree may not be balanced. That is, one branch of the tree may have more levels than another branch, and/or may include more virtual devices than another branch.

In one embodiment of the invention, it is possible to remove a disk from a storage pool without recreating the storage pool. Specifically, it may be possible to remove a single disk and/or to remove a virtual device that includes any number of underlying physical disks. In one embodiment of the invention, when a disk (or virtual device) is removed from a storage pool, blocks allocated to the disk (or physical disk(s) associated with the virtual device) are copied to one or more other disks in the storage pool. For convenience in discussing embodiments of the invention, the disk(s) to which the copied blocks are written are hereinafter referred to as replacement disk(s), and copies of blocks are referred to as replacement blocks. Further, because the disk to be removed is the source of the replacement blocks, the disk to be removed is hereinafter referred to as a source disk, and the blocks to be copied are referred to as source blocks.

In one embodiment of the invention, when source blocks are copied to replacement blocks, an abstraction layer is created for accessing (i.e., reading and/or modifying) the replacement blocks in place of the source blocks. Specifically, the abstraction layer may include an indirection object that maps locations of the source blocks to locations of the replacement blocks. In one embodiment of the invention, using an indirection object allows for the source blocks to be copied directly to the replacement disk(s). That is, it may not be necessary to recalculate checksums for the replacement blocks and/or parent blocks of the replacement blocks. Therefore, indirection objects may provide for efficient removal of disks from storage pools by minimizing computational overhead (e.g., processor cycles, disk accesses, etc.) associated with the creation of replacement blocks.

Figure 5:
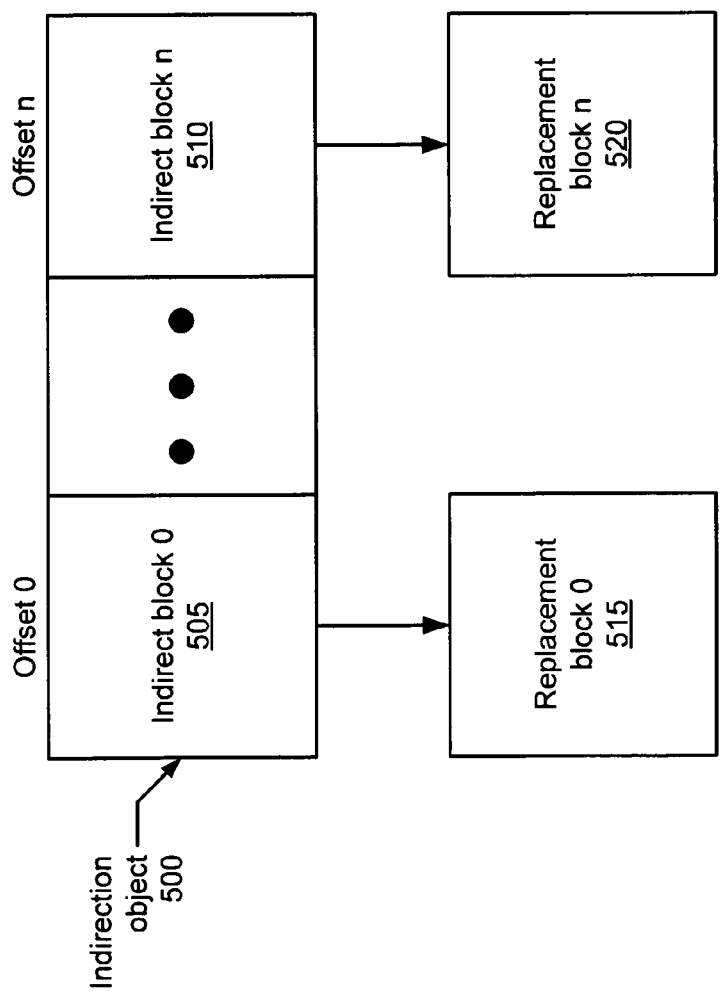
FIG. 5 shows a diagram of an indirection object in accordance with one embodiment of the invention.

FIG. 5 shows a diagram of an indirection object (500) in accordance with one embodiment of the invention. Specifically, the indirection object (500) may be implemented as one or more indirect blocks (e.g., indirect block 0 (505), indirect block n (510)). In one embodiment of the invention, each indirect block includes a pointer to a replacement block (e.g., replacement block 0 (515), replacement block n (520)). Further, the indirection object (500) may include multiple levels of indirect blocks, with only the lowest-level indirect blocks directly referencing the replacement blocks (see, e.g., FIG. 3 for one example of multiple levels of indirect blocks). Said another way, the indirection object (500) may effectively be arranged a hierarchical tree, or may be a portion of a hierarchical tree.

Further, each indirect block may be stored at an offset in the indirection object (500) corresponding to an offset of a source block on a source disk (i.e., the source blocks of which the replacement blocks are copies). Specifically, indirect blocks in the indirection object (500) may be stored at the same offsets as the corresponding source blocks. In this manner, the indirection object (500) may provide a convenient one-to-one mapping of locations of source blocks to locations of replacement blocks. Further, if the storage pool already includes indirect blocks and data blocks, the use of indirect blocks in the indirection object (500) may allow for the indirection block (500) to be stored using existing block storage mechanisms provided by the file system.

In one embodiment of the invention, the indirection object (500) is generated by a data management unit (DMU) (e.g., DMU (104) of FIG. 1) and managed by a storage pool allocator (SPA) (e.g., SPA (106) of FIG. 1).

Figure 6:
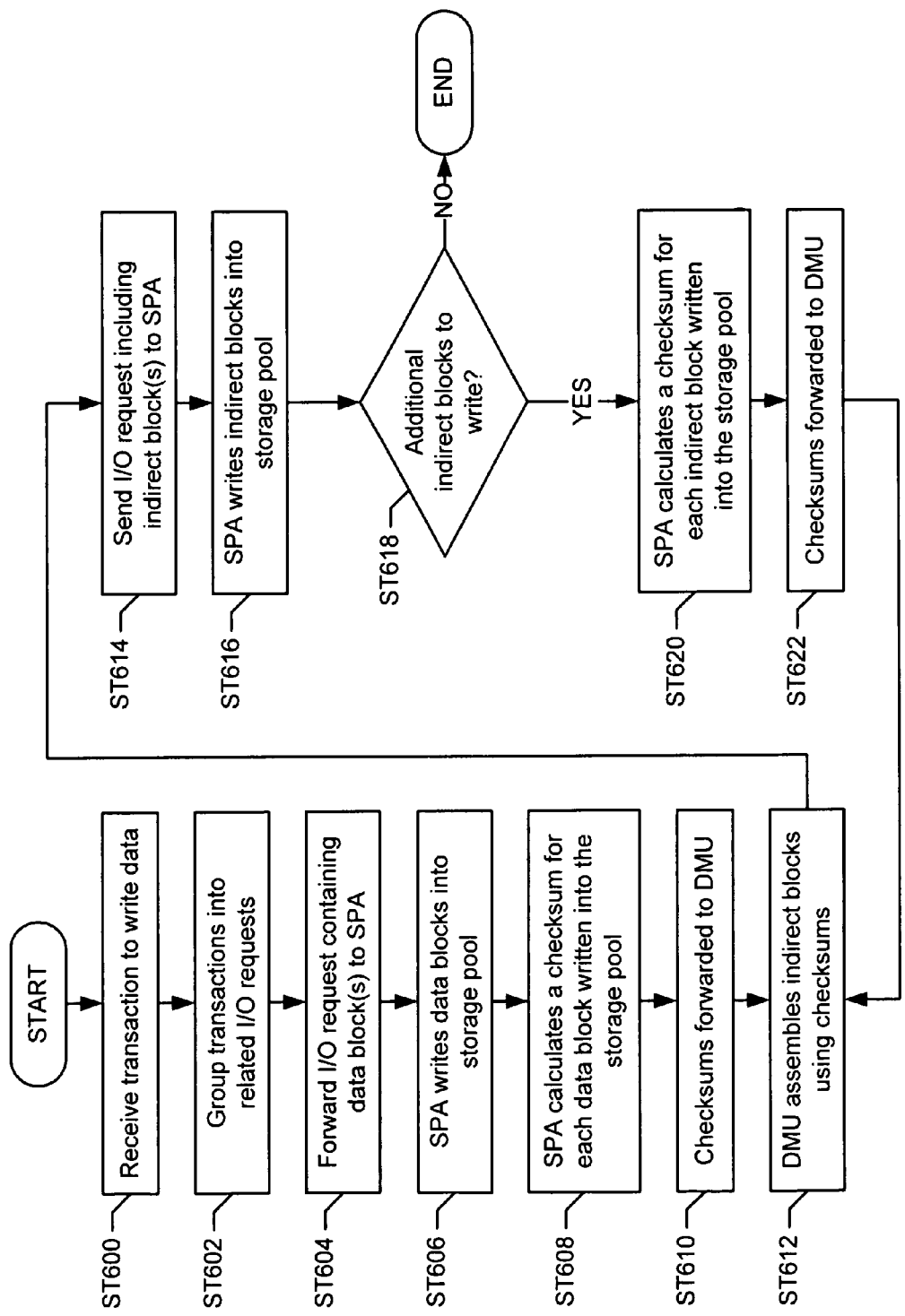
FIGS. 6-8 show flow charts in accordance with one embodiment of the invention.

Using the infrastructure described above in relation to FIGS. 1-4, the following discussion describes a method for writing data to a storage pool in accordance with one embodiment of the invention. FIG. 6 shows a flow chart in accordance with one embodiment of the invention. In one embodiment of the invention, one or more of the steps described below may be omitted, repeated, and/or performed in a different order. Accordingly, the specific arrangement of steps shown in FIG. 6 should not be construed as limiting the scope of the invention.

Initially, the DMU receives a transaction from an application, the operating system (or a subsystem therein), etc. (ST 600). The DMU subsequently groups the transaction into one or more I/O requests (ST 602). The I/O requests are subsequently forwarded to the SPA (ST 604).

In one embodiment of the invention, the transaction includes one or more data blocks, and/or one or more indirect blocks. As noted above, the file system is stored on disk using a hierarchical structure including data blocks and indirect blocks. Thus, for a given set of transactions, the first I/O request includes the data blocks to be written to disk, while subsequent I/O requests include the corresponding indirect blocks containing one or more block pointers. Accordingly, I/O request referenced in ST 604 includes data blocks.

Continuing with the discussion of FIG. 6, the SPA, upon receiving the I/O request including data blocks from the DMU, writes the data blocks into the storage pool (ST 606). The SPA subsequently calculates a checksum for each data block written into the storage pool (ST 608). In one embodiment, the checksum module (203 in FIG. 2) within the SPA is used to calculate the checksum for each data block written into the storage pool. The checksums are subsequently forwarded to the DMU (ST 610). The DMU then assembles the indirect blocks using the checksums (ST 612). Specifically, the DMU places the checksum for a given data block in the appropriate block pointer within the indirect block (i.e., the parent indirect block of the data block). Next, the indirect blocks are forwarded to the SPA (ST 614). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into the storage pool (ST 616). A determination is then made whether additional indirect blocks exist to write into the storage pool (i.e., whether the last indirect block written to the storage pool corresponds to the root block) (ST 618). If no additional indirect blocks exist, then the method is complete. However, if additional indirect blocks exist, then the SPA calculates the checksum from each of the indirect blocks written into the storage pool (ST 620). The checksums for each of the indirect blocks is subsequently forwarded to the DMU (ST 622). Steps ST 612 through ST 622 are subsequently repeated until the root block is written into the storage pool.

Figure 7:
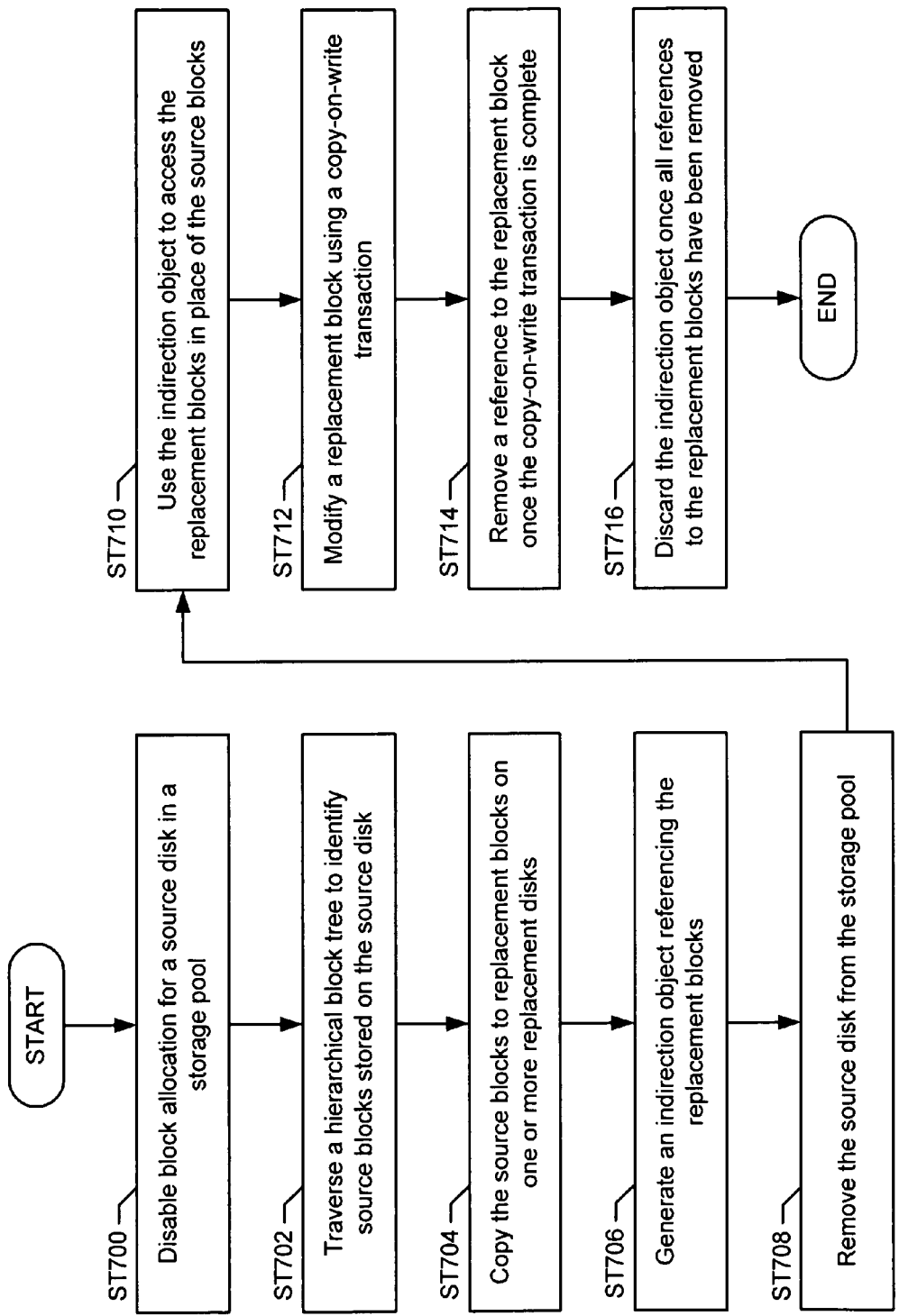

As discussed above, after blocks are written to a disk, the disk may be removed from the storage pool. FIG. 7 shows a flow chart in accordance with one embodiment of the invention. Specifically, FIG. 7 shows a flow chart of a method for removing a disk from a storage pool in accordance with one embodiment of the invention. In one embodiment of the invention, one or more of the steps described below may be omitted, repeated, and/or performed in a different order. Accordingly, the specific arrangement of steps shown in FIG. 7 should not be construed as limiting the scope of the invention.

In the following discussion, specific reference is made to source disks and replacement disks. In one embodiment of the invention, the steps described below may be equally applicable to virtual devices having one or more underlying physical disks. Specifically, removing a disk from a storage pool as described herein may be performed as part of removing a virtual device from the storage pool.

In one embodiment of the invention, block allocation for a source disk (i.e., the disk to be removed) in a storage pool is disabled (ST 700). Said another way, if a request to write a block to the storage pool is received, the source disk is not used to service the request. Specifically, disabling block allocation for the source disk may ensure that source blocks stored on the source disk remain consistent while replacement blocks are created.

In one embodiment of the invention, once block allocation is disabled for the source disk, a hierarchical block tree is traversed to identify source blocks that are stored on the source disk (ST 702). Specifically, as discussed above in relation to FIGS. 1-3, blocks in a storage pool may be stored in a hierarchical block tree. Further, blocks in the hierarchical block tree may be stored across multiple disks, depending for example on an allocation policy associated with the storage pool. Accordingly, the hierarchical block tree may be traversed to identify the specific blocks in the storage pool that are stored on the source disk. If blocks in the storage pool are not stored in a hierarchical block tree, any other appropriate process may be used to identify the source blocks stored on the source disk.

In one embodiment of the invention, the identified source blocks are subsequently copied to replacement blocks on one or more replacement disks (ST 704). Specifically, the replacement disk(s) are within the same storage pool as the source disk. In one embodiment of the invention, the replacement blocks are allocated to the replacement disk(s) according to an allocation policy associated with the storage pool.

In one embodiment of the invention, an indirection object referencing the replacement blocks is generated (ST 706). Indirection objects are discussed above in relation to FIG. 5. In one embodiment of the invention, generation of the indirection object occurs in stages, which may be dispersed between other steps described herein. For example, the structure of the indirection object (e.g., allocated memory and/or storage space, a programming element, etc.) may be prepared prior to disabling block allocation for the source disk, and indirect blocks may be added to the structure as source blocks are copied to replacement blocks. Accordingly, generation of the indirection object may not be complete until all of the indirect blocks are added to the indirection object.

Further, a replacement disk on which a replacement block is written may later be removed from the storage pool (i.e., after the replacement block is written). Accordingly, the replacement block may be copied onto another replacement disk, and another indirection object may be generated for the removed replacement disk. In view of the above discussion, one skilled in the art will appreciate that any number of indirection objects may be generated in this manner, and that multiple indirection objects may be used to identify an actual replacement block location (i.e., a location on a replacement disk that has not been removed from the storage pool). In one embodiment of the invention, the possibility of creating multiple indirection objects allows for any number of disks to be removed from the storage pool, as long as the remaining disk(s) provide enough free storage space to store the required replacement blocks.

In one embodiment of the invention, once the indirection object is generated, the source disk is removed from the storage pool (ST 708). Further, once the indirection object is generated, the indirection object may be used to access the replacement blocks in place of the source blocks (ST 710). Said another way, once the indirection object has been created, all requests to access the source blocks may be redirected, using the indirection object, to access the replacement blocks instead. In one embodiment of the invention, the indirection provided by the indirection object is completely transparent to the requesting process. That is, the requesting process may not be aware that the request is redirected.

As discussed above in relation to FIG. 3, in one embodiment of the invention, copy-on-write transactions are performed for every data write request to a file (i.e., every time a modification is made to an indirect block or a data block). Accordingly, after a replacement block is written to a replacement disk (i.e., as described in ST 704), the replacement block may be modified using a copy-on-write transaction (ST 712).

Further, as discussed above, a copy-on-write transaction may involve rewriting all parent blocks of the replacement block, up to the root block of the block tree. Specifically, the chain of blocks up to the root block may be rewritten so that all block pointers and/or checksums in the chain are consistent with the newly allocated block. Therefore, once the copy-on-write transaction is complete, the source block may no longer be referenced by any blocks in the chain of blocks. If no other references (e.g., block pointers in indirect blocks) to the source block exist in the storage pool, the corresponding mapping in the indirection object may no longer be needed. Accordingly, the reference to the replacement block may be removed from the indirection object (ST 714). Specifically, if the reference is implemented as an indirect block, as discussed above in relation to FIG. 5, the indirect block may be deallocated. Alternatively, if another reference to the source block remains in the storage pool (e.g., in a snapshot of the storage pool), the reference to the replacement block may be retained in the indirection object.

Further, if references (e.g., indirect blocks) to replacement blocks are removed from the indirection object as replacement blocks are rewritten, all of the references in the indirection object may eventually be removed from the indirection object. Accordingly, in one embodiment of the invention, the indirection object is discarded (i.e., fully deallocated from memory and/or the storage pool) once all references to the replacement blocks are removed (ST 716). Alternatively, the indirection object may be retained and used again later if another disk is removed from the storage pool. In one embodiment of the invention, discarding the indirection object may reduce memory and/or storage overhead for the file system when the indirection object is not needed.

Figure 8:
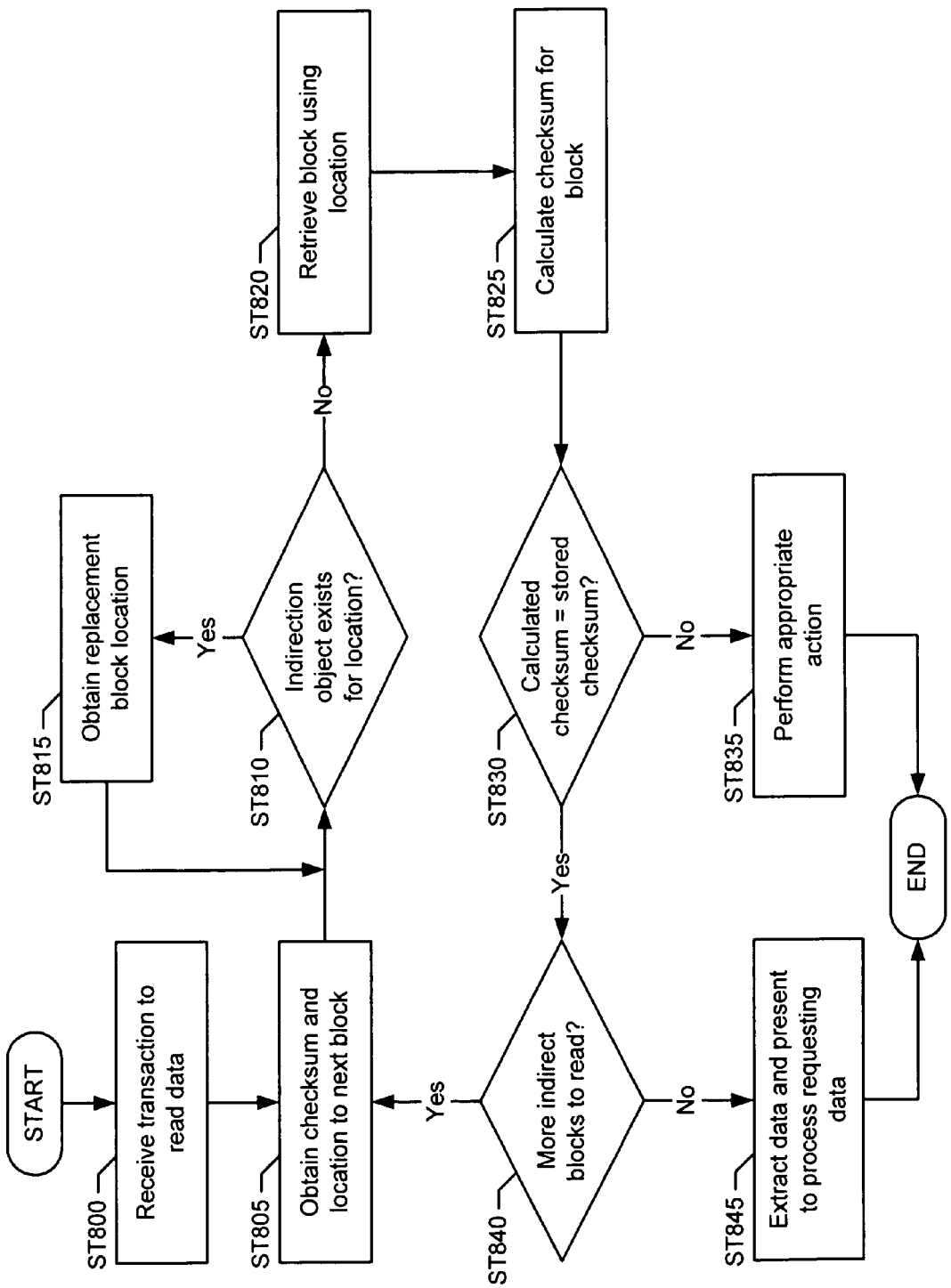

FIG. 8 shows a flow chart in accordance with one embodiment of the invention. More specifically, FIG. 8 details a method for reading data in accordance with one embodiment of the invention. In one embodiment of the invention, one or more of the steps described below may be omitted, repeated, and/or performed in a different order. Accordingly, the specific arrangement of steps shown in FIG. 8 should not be construed as limiting the scope of the invention.

Initially, a transaction to read data is received (ST 800). A checksum and a location to the next block (i.e., a data block or an indirect block) stored in the root block are subsequently retrieved (ST 805). As discussed above in relation to FIG. 3, the location of the block may include a metaslab ID and offset. Specifically, the metaslab ID may identify a particular disk and/or virtual device on which the metaslab is located.

In one embodiment of the invention, a determination is subsequently made about whether an indirection object exists for the block location (ST 810). Specifically, a determination is made whether an indirection object exists that corresponds to the disk and/or virtual device where the block is expected to be found. If an indirection block exists for the block location, then a replacement block location is identified using the indirection object (ST 815). Specifically, the same offset at which the block is expected to be found may be referenced in the indirection object to identify the location of the replacement block.

As discussed above in relation to FIG. 7, in one embodiment of the invention, a replacement disk is also removed from the storage pool. Therefore, once a replacement block location is identified, it may be necessary to make a determination whether an indirection object exists for the replacement block location. Accordingly, in one embodiment of the invention, ST 810 and ST 815 are repeated until a replacement block location is identified for which no indirection object exists. Once a block location is identified for which no indirection object exists (i.e., the block location obtained in ST 805 or a replacement block location identified in ST 815), the block stored at the block location is retrieved (ST 820). Specifically, the absence of an indirection object for the block location indicates that the block location is valid, i.e., that the disk and/or virtual device identified by the block location remains in the storage pool.

The checksum of the retrieved block is then calculated (ST 825). A determination is subsequently made about whether the stored checksum is equal to the calculated checksum (ST 830). In one embodiment of the invention, if source blocks are copied directly to replacement blocks (i.e., without recalculating checksums), then the stored checksum used in ST 830 is effectively the checksum of the source block. Further, because the replacement block is a direct copy of the source block, the calculated checksum is also consistent with the checksum of the source block (that is, unless the replacement block is corrupted). Therefore, copying source blocks directly to replacement blocks may eliminate the need to handle replacement blocks differently when validating checksums (i.e., ST 830), thereby reducing computational overhead associated with reading data from replacement blocks.

If the stored checksum is not equal to the calculated checksum, then an appropriate action is performed (e.g., an error message is generated indicating that the data is corrupted) (ST 835). If the stored checksum is equal to the calculated checksum, then a determination is made whether the retrieved block is a data block (ST 840). If the retrieved block is a data block, then the data is extracted from the data block and presented to the process requesting the data (ST 845). Alternatively, if the retrieved block is not a data block, then the location of the next block (stored within a block pointer within the retrieved block) is obtained (ST 805). Steps ST 810 through ST 840 are subsequently repeated until either data corruption is encountered (i.e., ST 835) or the data block is encountered (i.e., ST 845).

Figure 9A:
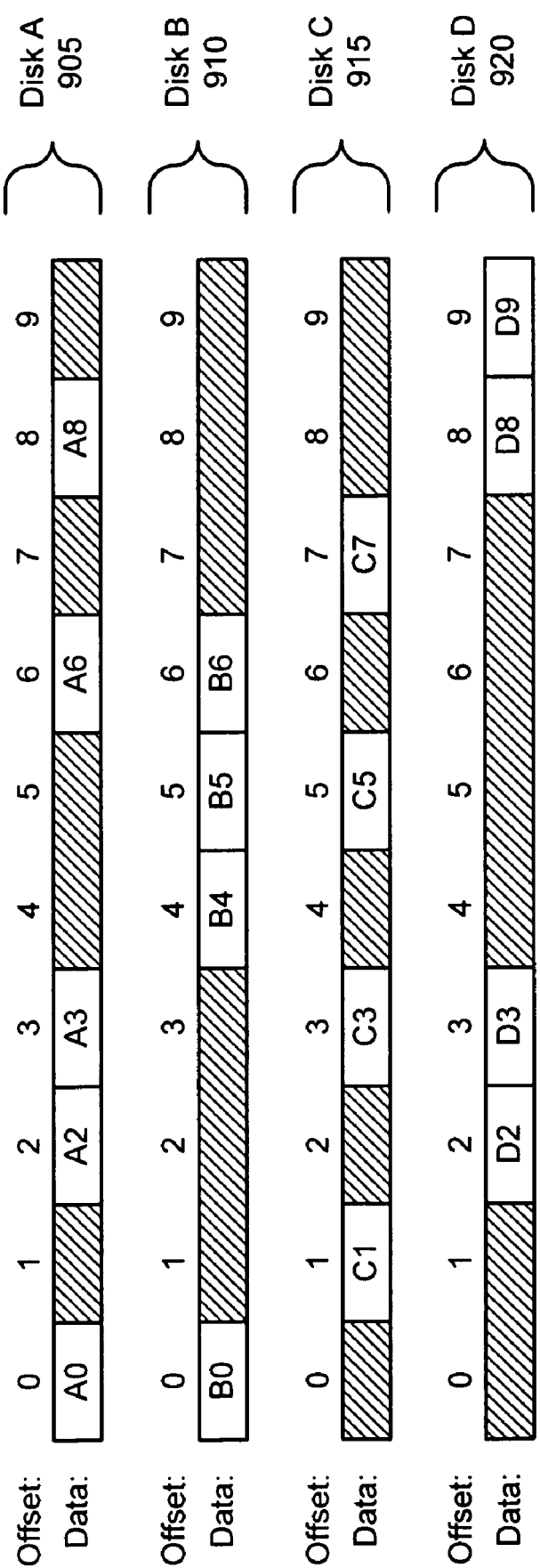
FIGS. 9A-9C show diagrams of an example of block reallocation in accordance with one embodiment of the invention.
Figure 9B:
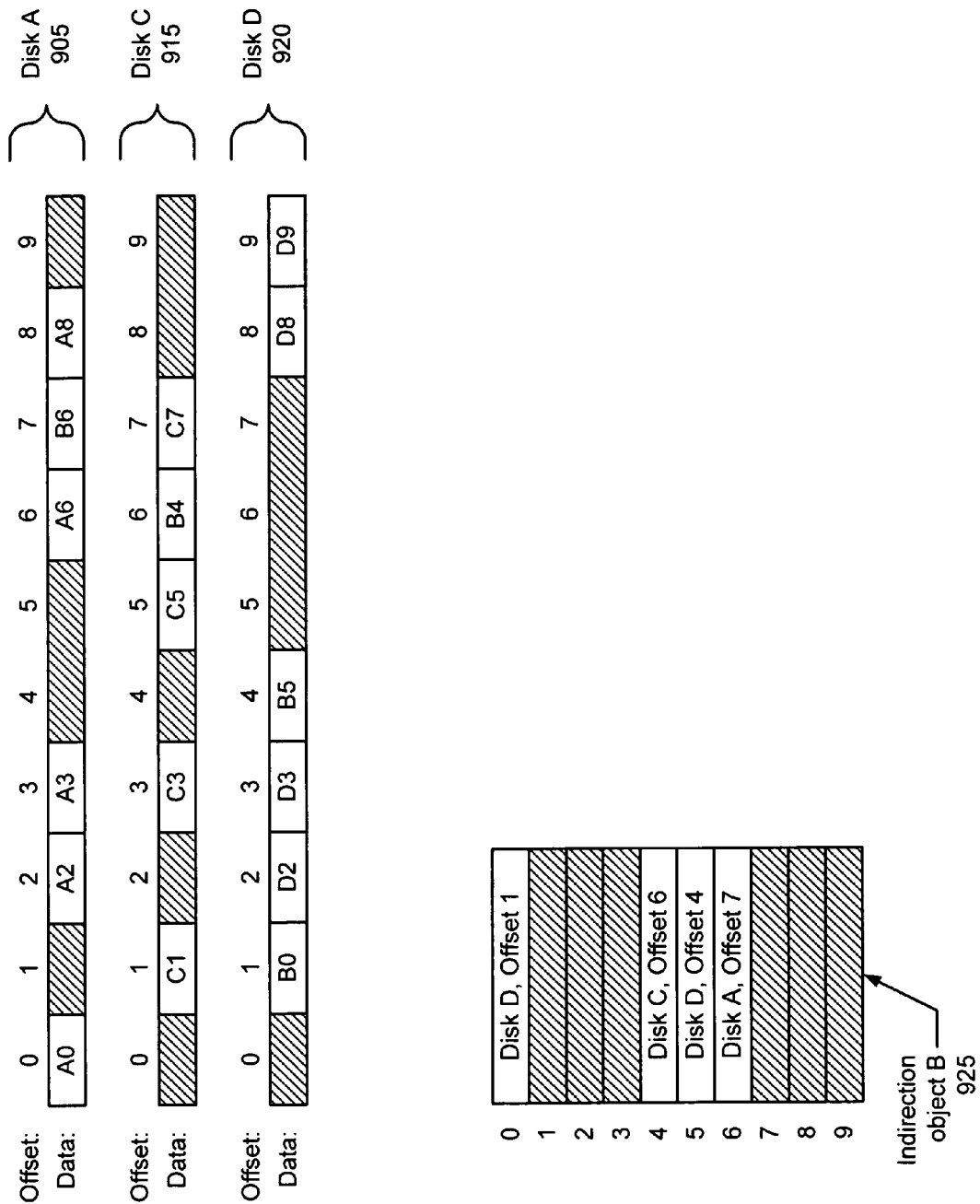
Figure 9C:
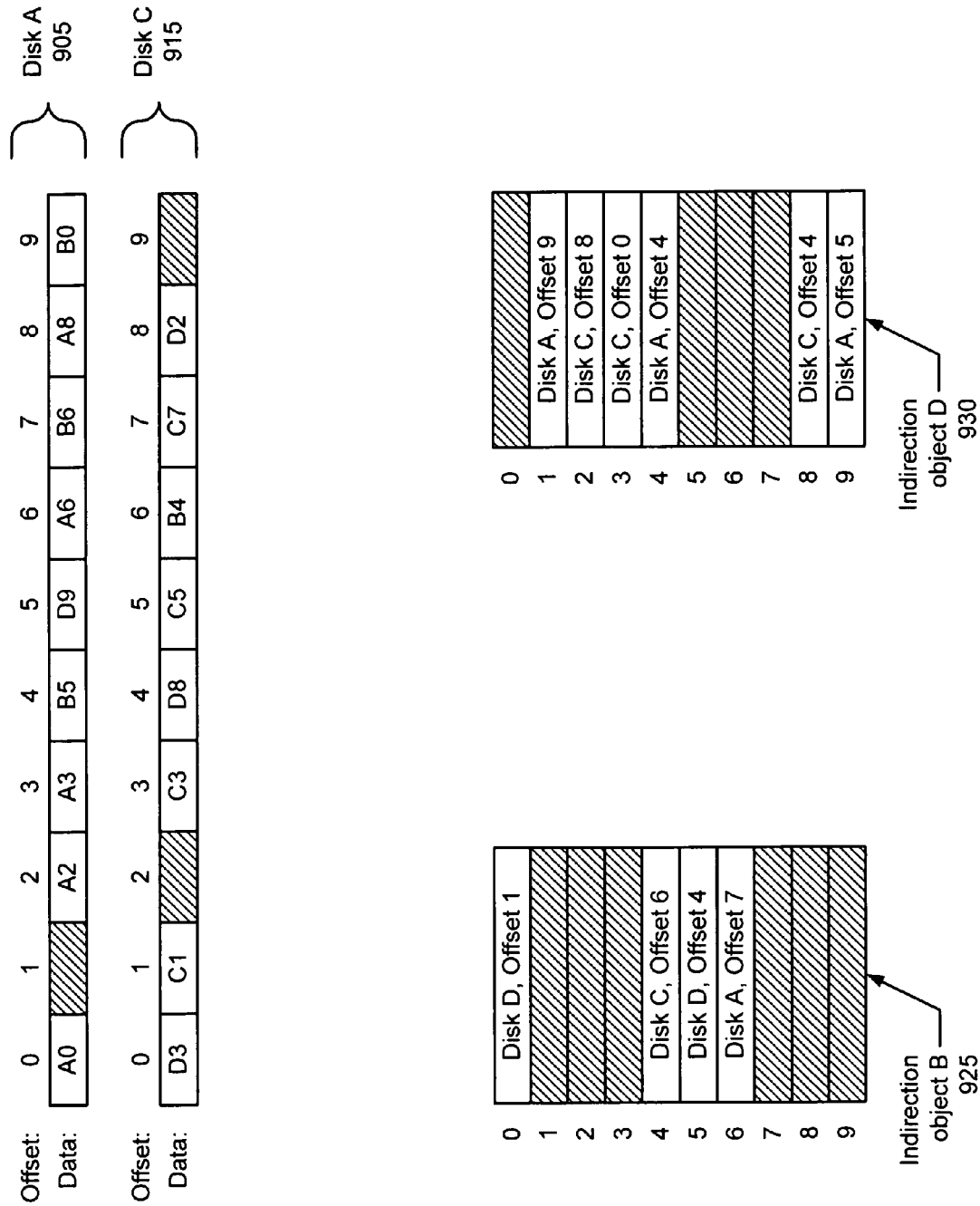

FIGS. 9A-9C show diagrams of an example of block reallocation in accordance with one embodiment of the invention. One skilled in the art will appreciate that FIGS. 9A-9C are provided for exemplary purposes only and accordingly should not be construed as limiting the scope of the invention in any way.

Initially, as shown in FIG. 9A, a storage pool includes four disks (i.e., disk A (905), disk B (910), disk C (915), disk D (920)). Each disk has data stored thereon at various offsets. For convenience in describing this example, data in this example is identified by a concatenation of the original disk letter and the offset where the data is initially stored. For example, data initially stored at offset 4 on disk B (910) is identified by the data value B4.

In FIG. 9B, disk B (910) is removed from the storage pool. Specifically, as part of removing disk B (910) from the storage pool, blocks stored on disk B (910) have been copied to replacement blocks on disk A (905), disk C (915), and disk D (920). Further, indirection object B (925) has been generated to provide a mapping from the source blocks on disk B (910) to the replacement blocks on disk A (905), disk C (915), and disk D (920). For example, as indicated by indirection object B (925), the data stored at offset 0 of disk B (910) has been copied to a replacement block stored at offset 1 on disk D (920). Indirection object B (925) further includes similar mappings for all the other source blocks from disk B (910) that were copied to replacement blocks.

To access a block that was previously accessible on disk B (910), indirection object B (925) is used to identify the location of the corresponding replacement block. For example, suppose a request is received to access the block stored at offset 5 of disk B (910). Disk B (910) is no longer in the storage pool, so indirection object B (925) is used to identify the location of a replacement block. Specifically, offset 5 of indirection object B (925) references offset 4 of disk D (920). Therefore, the replacement block stored at offset 4 of disk D (920) is accessed in place of the source block on disk B (910). As shown in FIG. 9B, the data stored in the replacement block is the same as the data in the source block. Thus, the request is serviced correctly.

In FIG. 9C, disk D (920) is removed from the storage pool. Specifically, as part of removing disk D (920) from the storage pool, blocks stored on disk D (920) have been copied to replacement blocks on disk A (905) and disk C (915). Further, indirection object D (930) has been generated to provide a mapping from the source blocks on disk D (920) to the replacement blocks on disk A (905) and disk C (915). For example, as indicated by indirection object D (930), the data stored at offset 3 of disk D (920) has been copied to a replacement block stored at offset 0 on disk C (915). Indirection object D (930) further includes similar mappings for all the other source blocks from disk D (920) that were copied to replacement blocks.

Those skilled in the art will appreciate that some of the source blocks copied from disk D (920) to replacement blocks on disk A (905) and disk C (915) are themselves replacement blocks corresponding to source blocks on disk B (910). Accordingly, to access these blocks, it may be necessary to use both indirection object B (925) and indirection object D (930). For example, suppose a request is received to access a block at offset 5 of disk B (910). Disk B (910) is no longer in the storage pool, so indirection object B (925) is used to identify the location of a replacement block. Specifically, offset 5 of indirection object B (925) references offset 4 of disk D (920). However, disk D (920) is also no longer in the storage pool, so indirection object D (930) is used to identify the location of another replacement block. Specifically, offset 4 of indirection object D (930) references offset 4 of disk A (905). Disk A (905) is in the storage pool, as evidenced by the fact that no indirection object exists for disk A (905). Therefore, the replacement block stored at offset 4 of disk A (905) is accessed in place of the block that was requested.

Figure 10:
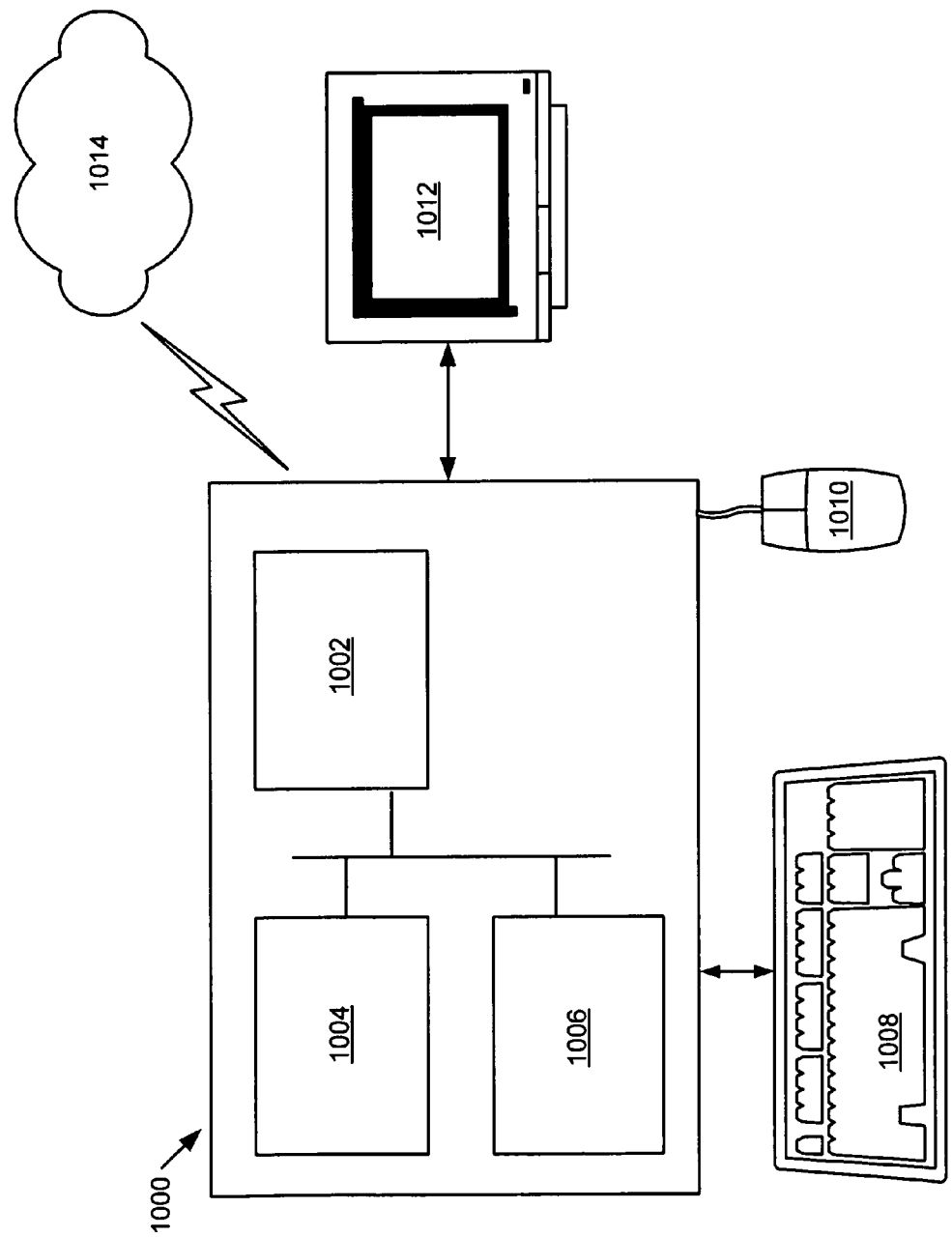
FIG. 10 shows a diagram of a computer system in accordance with one embodiment of the invention.

Embodiments of the invention may be implemented on virtually any type of computer regardless of the platform being used. For example, as shown in FIG. 10, a computer system (1000) includes a processor (1002), associated memory (1004), a storage device (1006), and numerous other elements and functionalities typical of today's computers (not shown). The computer (1000) may also include input means, such as a keyboard (1008) and a mouse (1010), and output means, such as a monitor (1012). The computer system (1000) may be connected to a network (1014) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., operating system, file system, storage pool, disk, system call interface, data management unit, storage pool allocator, metaslab allocator, I/O management module, compression module, encryption module, checksum module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer readable medium comprising executable instructions for reallocating blocks in a storage pool, which when executed by a processor performs a method, the method comprising:

copying a plurality of source blocks to a plurality of replacement blocks,
wherein the plurality of source blocks is stored on a source disk in the storage pool, and
wherein the plurality of replacement blocks is stored on at least one replacement disk in the storage pool;
generating a first indirection object,
wherein the first indirection object comprises a mapping of locations of the plurality of source blocks to locations of the plurality of replacement blocks;
modifying a replacement block selected from the plurality of replacement blocks using a copy-on-write transaction; and
removing a reference to the replacement block from the first indirection object once the copy-on-write transaction is complete.

2. The computer readable medium of claim 1, the method further comprising:
receiving a request to access a source block selected from the plurality of source blocks;
identifying a location of a replacement block selected from the plurality of replacement blocks using the first indirection object; and
accessing the replacement block in response to the request.

3. The computer readable medium of claim 1, the method further comprising:
disabling block allocation for the source disk prior to copying the plurality of source blocks to the plurality of replacement blocks.

4. The computer readable medium of claim 1, the method further comprising:
traversing a hierarchical block tree in the storage pool to identify the plurality of source blocks.

5. The computer readable medium of claim 1, the method further comprising:
removing the source disk from the storage pool once the first indirection object is generated.

6. The computer readable medium of claim 1, the method further comprising:
discarding the first indirection object once all references to the plurality of replacements blocks are removed from the first indirection object.

7. The computer readable medium of claim 1, the method further comprising:
copying a first replacement block selected from the plurality of replacement blocks to a second replacement block; and
generating a second indirection object referencing the second replacement block,
wherein the first replacement block is stored on a first disk in the storage pool,
wherein the second replacement block is stored on a second disk in the storage pool, and
wherein the second indirection object comprises a mapping of a location of the first replacement block to a location of the second replacement block.

8. The computer readable medium of claim 1, wherein the first indirection object comprises at least one selected from a group consisting of a plurality of indirect blocks and a plurality of data blocks.

9. The computer readable medium of claim 1, wherein the source disk is selected from a plurality of source disks in a virtual device.

10. The computer readable medium of claim 1, wherein a source block selected from the plurality of source blocks is located at a specific offset on the source disk, and wherein a reference to a corresponding replacement block selected from the plurality of replacement blocks is located at the specific offset in the first indirection object.

11. A system comprising:
a storage pool comprising:
a source disk comprising a plurality of source blocks, and
a replacement disk; and a file system configured to:
copy the plurality of source blocks to a plurality of replacement blocks on the replacement disk,
generate an indirection object,
modify a replacement block selected from the plurality of replacement blocks using a
copy-on-write transaction, and
remove a reference to the replacement block from the indirection object once the copy-on-write transaction is complete,
wherein the indirection object comprises a mapping of locations of the plurality of source blocks to locations of the plurality of replacement blocks.

12. The system of claim 11, wherein the file system is further configured to:
receive a request to access a source block selected from the plurality of source blocks;
identify a location of a replacement block selected from the plurality of replacement blocks using the indirection object; and
access the replacement block in response to the request.

13. The system of claim 11, wherein the file system is further configured to:
disable block allocation for the source disk prior to copying the plurality of source blocks to the plurality of replacement blocks.

14. The system of claim 11, wherein the file system is further configured to:
traverse a hierarchical block tree in the storage pool to identify the plurality of source blocks.

15. The system of claim 11, wherein the file system is further configured to:
remove the source disk from the storage pool once the indirection object is generated.

16. The system of claim 11, wherein the file system is further configured to:
discard the indirection object once all references to the plurality of replacements blocks are removed from the indirection object.

17. The system of claim 11, wherein the file system is further configured to:
copy a first replacement block selected from the plurality of replacement blocks to a second replacement block; and
generate a second indirection object referencing the second replacement block,
wherein the first replacement block is stored on a first disk in the storage pool,
wherein the second replacement block is stored on a second disk in the storage pool, and
wherein the second indirection object comprises a mapping of a location of the first replacement block to a location of the second replacement block.

* * * * *